INVENTOR.
HERMANN W. EHRENSPECK

BY Harry A. Herbert Jr.
Martin J. Finnegan
ATTORNEYS

Aug. 11, 1970  H. W. EHRENSPECK  3,524,191
ENDFIRE ANTENNA ARRAY IN WHICH THE ELEMENTS OF ARRAY ARE
BENT AND HAVE PORTIONS RUNNING ALONG LENGTH OF ARRAY
Filed April 12, 1968  4 Sheets-Sheet 2
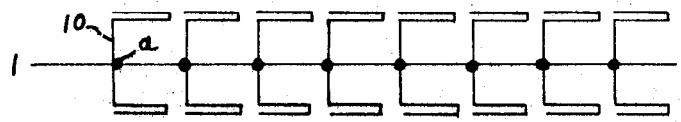
Fig. 7
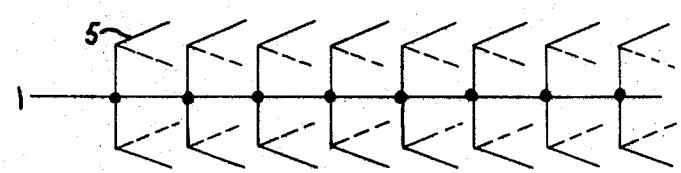
Fig. 8
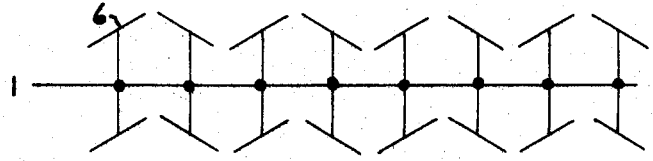
Fig. 9
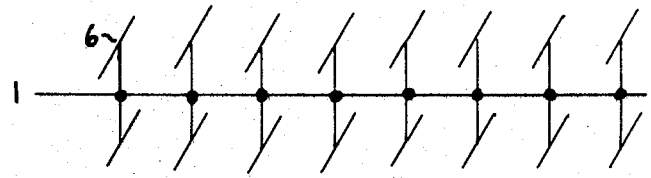
Fig. 10
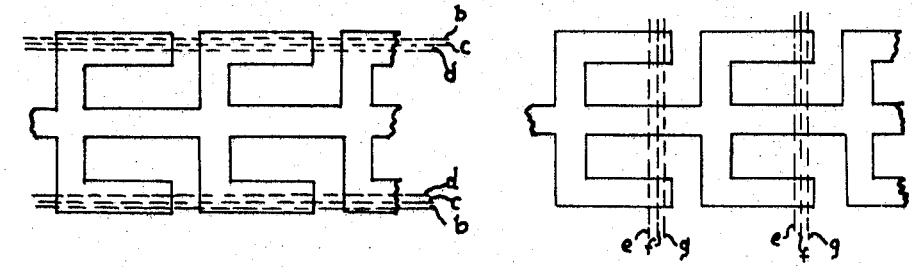
Fig. 11
Fig. 12
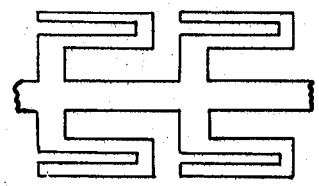
Fig. 13
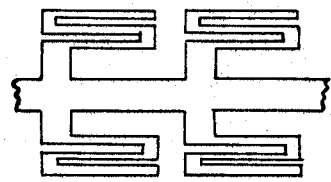
Fig. 14
INVENTOR.
HERMANN W. EHRENSPECK
BY
Harry A. Herbert Jr
Martin J. Finnegan
ATTORNEYS Aug. 11, 1970            H. W. EHRENSPECK            3,524,191
       ENDFIRE ANTENNA ARRAY IN WHICH THE ELEMENTS OF ARRAY ARE
           BENT AND HAVE PORTIONS RUNNING ALONG LENGTH OF ARRAY
Filed April 12, 1968                                4 Sheets-Sheet 3

INVENTOR.
HERMANN W. EHRENSPECK
BY
Harry A. Herbert Jr. and
Martin J. Finnegan
ATTORNEYS INVENTOR.
HERMANN W. EHRENSPECK
BY
Harry A. Herbert Jr.
Martin J. Finnegan
ATTORNEYS

United States Patent Office

3,524,191
Patented Aug. 11, 1970

3,524,191
ENDFIRE ANTENNA ARRAY IN WHICH THE ELEMENTS OF ARRAY ARE BENT AND HAVE PORTIONS RUNNING ALONG LENGTH OF ARRAY
Hermann W. Ehrenspeck, 94 Farnham St., Belmont, Mass. 02178
Filed Apr. 12, 1968, Ser. No. 720,863
Int. Cl. H01g 19/30
U.S. Cl. 343—819                        3 Claims

ABSTRACT OF THE DISCLOSURE

The invention relates to a directional antenna of the endfire type which uses a wave directing structure with segments having especially small dimensions transverse to the longitudinal axis, and with additional segments in parallel relation to said axis.

---

The invention described herein may be manufactured and used by or for the United States Government for governmental purposes without the payment to me of any royalty thereon.

CROSS-REFERENCES TO RELATED APPLICATIONS

This application is directed to subject matter disclosed in my pending application Ser. No. 411,649, filed Nov. 16, 1964, now abandoned, entitled "Directional Antenna and Methods for Its Fabrication and Tuning."

BACKGROUND OF THE INVENTION

Examples of directional antennas of the endfire type are the well-known yagi antenna and the zig-zag and saw blade antenna described in German Pat. No. 1,069,707. In the latter types, the structure consists of a continuous wire which is bent in a zig-zag or sinusoidal curve, respectively, or a strip of sheet metal which is cut into the form of a saw blade. In the case of the yagi antenna, the structure consists of a row of metallic rods, often called directors, which are mounted to a boom extending in the longitudial axis of the structure and which have the direction of the polarization of the electromagnetic field to be transmitted or received. Length and spacing of the rods are narrowly coupled parameters which have to be chosen so that the surface wave propagates on the structure with a phase velocity less than that of light. In general, for a wider element spacing the element length has to be increased if the same phase velocity is desired. These facts are known and design data for yagis based on phase velocity measurements are, for example, shown in the report: "A New Method for Obtaining Maximum Gain From Yagi Antennas" by H. W. Ehrenspeck and H. Poehler, published in IRE Transactions on Antennas and Propagation, PCAP 7:379–386, October 1959. It has been found that for obtaining maximum gain from conventional yagi antennas with a length of 1 to 2 wave lengths, the rod elements have to have a length of .40 to .45 wave lengths for an element spacing of .20 to .40 wave lengths.

Antenna structures with such large dimensions transverse to the longitudinal axis are in general very spacious and can be damaged during the assemblage as well as in use. Another problem is their packing and transport.

There are, in general, only very limited possibilities for decreasing the dimensions of the structure of a yagi antenna transverse to its longitudinal axis. One solution would be the use of rod elements with a larger diameter than usual, another the use of rod elements with their diameter increasing towards their open ends. For both cases, however, the amount of material and the wind resistance would be increased. Another solution would be a smaller element spacing; but again the amount of material and the wind resistance would be increased. None of the mentioned solutions would bring a real advantage.

BRIEF DESCRIPTION OF THE INVENTION

It is the goal of this invention to show another way that leads to an essential decrease in the dimensions of such surface wave structures.

According to the invention, the structure does not consist of straight rods or strip elements as usual, but of such elements which extend besides their extension in the direction of polarization in at least one other direction, for example in the direction of the longitudinal axis of the structure and/or transverse to the direction of polarization without forming a continuous structure like, for example, a zig-zag antenna. Therefore, the structures according to the invention consist of elements which besides the usual parts extending in the direction of polarization have at their open ends at least one further part which is bent off from the direction of the first part, so that for maintaining the prescribed phase and tuning conditions on the structure the coupling between the single elements is essentially increased and at the same time the effective height of the elements is enlarged. Both facts fortunately result in much smaller dimensions of the structure transverse to its axis. The gain is practically the same as that of a yagi if both antennas are optimized for the same frequency. In the structure according to the invention, the element coupling is increased in a manner that does not require any corresponding increase in the transverse length of component elements. For the prior art structures this result could only be achieved by a further length increase and/or narrower spacing of the elements. It should be mentioned that endfire antennas built for different applications can be compared in gain only if they have the same length and are optimized for the same frequency.

Structures according to the invention can be built from Channel-shaped, I-shaped, Sigma-shaped, or Z-shaped elements which are in their center points mounted on a metallic or a nonconducting boom. Also other shapes of elements which fulfill the same purpose, can be thought of. The parts of the elements, which extend in different directions do not need to be straight parts; they may have any form of a curve. It is essential only that the elements are of such a shape that they can be analyzed as consisting of two parts extending in two directions perpendicular to each other; that part which is transverse to the longitudinal axis of the structure and connected with it, extends in the direction of polarization of the electromagnetic field; and those parts of the elements which are perpendicular to the first part and connected with them at their open ends, extend in the direction of the longitudinal axis of the structure or are perpendicular to it or form an acute angle with it. Any increase in length of those parts which extend perpendicular to the direction of polarization, result in a decrease of the dimensions of the structure transverse to its axis. However, the spacing of the elements has to be smaller than a half wave length, because with wider spacing the desired wave pattern cannot be achieved. If we assume the elements to be equally spaced and tuned for the same frequency, those elements with parts extending in directions parallel to the axial direction have a stronger mutual coupling resulting in a smaller extension of the structure transverse to its axis, than structures with elements with their parts perpendicular to the direction of polarization forming a right or acute angle with the axis.

Experiments performed with Channel-shaped elements, have shown that the width of the structure transverse to its axis, which is about 0.40 to 0.45 wave lengths for obtaining maximum gain at a certain frequency, can be reduced to about 0.20 wave lengths with no noticeable decrease in gain. Also structures with a width of only 0.10 wave length could be built with the same maximum gain. However, the bandwidth of antennas with such narrow dimensions covered only a relatively small frequency band.

DESCRIPTION OF THE PREFERRED EMBODIMENTS

In the drawings:

FIGS. 2 to 10 show eight different structures embodying the invention;

FIGS. 11 to 14 show two different timing methods;

Figure 1:
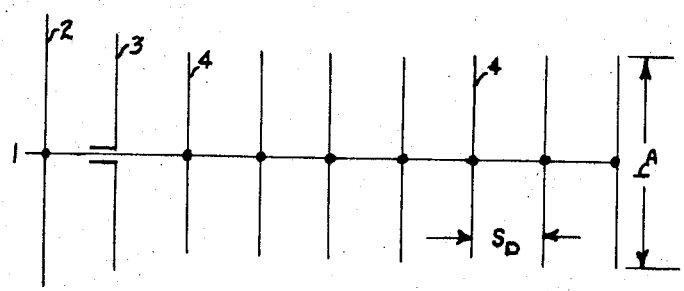
FIG. 1 is a schematic representation of a conventional yagi antenna structure.

FIG. 1 shows for comparison purposes a schematic sketch of a yagi antenna which uses, as usual, a row of rod elements 4, called directors, as slow wave structure. The length of the elements which are mounted to the boom 1, is marked as $h_D$, their spacing as $s_D$. For obtaining maximum gain from the antenna, the parameters $h_D$ and $s_D$ have to be chosen such that the surface wave propagates over the structure with a certain optimum phase velocity—smaller than that of the light—which is a function of the length of the structure. Numerals 2 and 3 designate the feed system. It consists of the energized dipole 3 which may be a straight as well as a folded dipole, and a reflctor 2 behind it.

Figure 2:
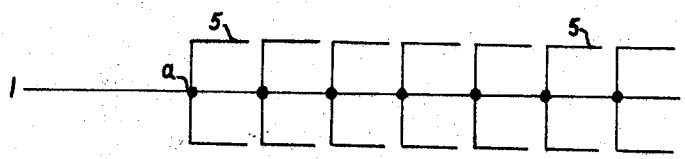
Figure 3:
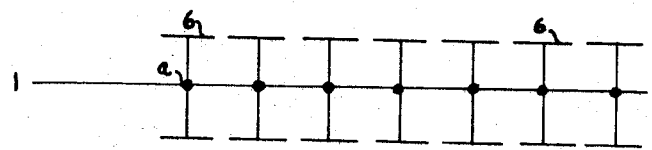
Figure 4:
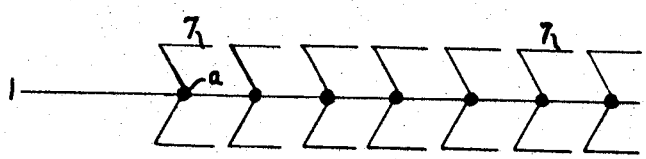

FIGS. 2 to 5 show four samples of wave directing structures according to the invention. As feed system, the same dipole reflector combination 2, 3 as shown in FIG. 1 or any other endfire feed system may be used. While the elements 5, 6 and 7 shown in FIGS. 2, 3 and 4 are symmetric in respect to the longitudinal axis of the structure, sample 5 is constructed from elements 8 with their open ends bent into opposite directions.

Figure 5:
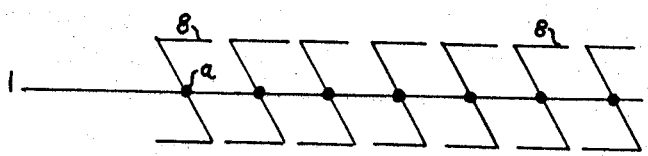

In detail, FIG. 2 shows a sample of a slow wave structure with channel-shaped elements which are in their center points connected with the boom, as indicated by the points a. This metallic connection is not a necessity, rather the boom may be made from a non-conducting material, or the elements may be with or without metal connections glued on a non-conducting sheet. The samples shown in FIGS. 3, 4 and 5 are constructed from I-shaped, sigma-shaped, or Z-shaped elements. All slow wave structures shown in FIGS. 2 to 5 are equivalent in efficiency. However, their dimensions transverse to the axis are somewhat different, for the same phase velocity. The smallest dimensions are obtained with the channel-shaped element shown in FIG. 2.

Figure 6:
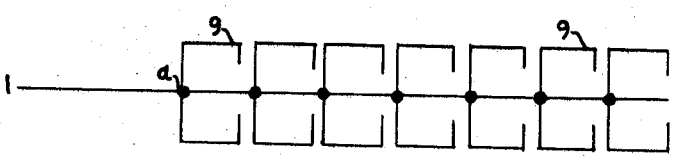

A further example is demonstrated in FIG. 6. It is very similar to the structure of FIG. 2; but those parts of the elements 9 which are perpendicular to the direction of polarization have at their open ends additional parts which extend in the direction towards the axis of the structure, and thus bring a further increase of the coupling between the elements. Such additional parts can also be used at the structures according to FIGS. 3 to 5.

Of special interest is the structure shown in FIG. 7. Here the elements again have the same basic shape as shown in FIG. 2, but those parts of the element 10, which are parallel to the axis are at least once more bent (mostly by 180°), so that they continue in the opposite direction, mostly parallel to the first part. This type of structure has, assuming the same tuning conditions, the smallest extension transverse to the axis, however its frequency bandwidth is somewhat narrower, than that of the other structures. This last mentioned method can also be applied to the structures shown in FIGS. 3 to 6.

A further decrease in the extension transverse to the axis, which is applicable to all structures, can be obtained, if at least a part of the structure is embedded in low-loss dielectric material. Such antennas represent very small and sturdy structures which may be of special interest for UHF-frequency bands.

In FIGS. 2 to 7, those parts of the elements which extend in the direction perpendicular to that of the field polarization were so far assumed as parallel to the longitudinal axis of the structure and lying in a plane defined by the axis and the direction of polarization. These parts may also be bent away or towards the axis of the structure or form an angle of up to 90° with the above plane. FIG. 8 shows a slow wave structure according to FIG. 2 with its elements 5 bent away from the axis (solid line), respectively bent towards the axis (dashed line). In FIGS. 9 and 10, structures according to FIG. 3 are shown with its elements 6 bent by 45° (in FIG. 9) and 90° (in FIG. 10) from the direction parallel to the axis. Because any change of the direction of these parts results in a change of the phase velocity of the structure, it can within certain limits, be used for tuning the endfire antenna built by such a structure.

The application of the invention to an already existing yagi antenna makes it possible to decrease its dimensions transverse to the axis and thus to increase its stability. The spacing between the directors has to be wide enough so that they can be bent towards the next following directors without touching them. For a further increase of the stability, the open ends of the bent directors may be connected with the following directors by non-conducting material. In an experimental model, the dimensions of the row of directors transverse to the antenna axis could be decreased to one half, without a noticeable change in gain.

Slow wave structures according to the invention, as shown in FIGS. 2 to 6 may also be stamped as complete units from metal sheet material. In order to obtain an endfire with maximum gain for a prescribed frequency range the dimensions of the structure should be optimized for the lowest frequency. Then, in a second step, the structure could be cut to length, tuned for maximum gain at higher frequencies if necessary, and made sturdy by stamped rib reinforcements.

There are different methods for tuning the structures. Two examples are shown in FIGS. 11 and 12. According to FIG. 12, those parts of the elements which extend in the direction of polarization are cut in steps along the lines e—e, f—f, and g—g; according to FIG. 11 of the length of the parts extending parallel to the axis are cut as indicated by the lines b—b, c—c and d—d. In both cases the frenquency for which maximum gain is obtained is increased. Both methods are, with certain modifications, also applicable for the structures shown in FIGS. 3 and 6.

According to another method, the frequency range of the stamped structures can also be changed if one or more slots are cut into those parts of the elements which extend in the axial direction of the structure. In contrast to the first two methods the application of slots brings maximum gain at lower frequencies. FIGS. 13 and 14 shows such structures. The frequency change depends on the number and depth of the slots.

By applying the described methods of tuning a slow wave structure can be adjusted for maximum gain over a wide frequency range. For best results such a structure should be in the first step stamped for the center frequency of the desired frequency range. Then, in a second step it can be adjusted for the higher frequencies by applying one of the tuning methods shown in FIGS. 11 and 12, and for the lower frequencies by one of the tuning methods shown in FIGS. 13 and 14.

Figure 15:
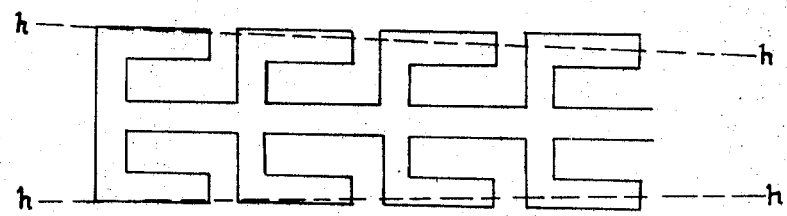
FIGS. 15 to 17 show three different fabricating methods.

For some applications on the endfire field, it is advantageous to use structures with not-constant phase velocity over the antenna length. For an increase in phase velocity towards the radiating end, for example, side lobes and backwards radiation can be kept at lower levels and the bandwidth of the antenna can be increased. These results may be obtained in various ways: First, by a continuous decrease of the dimensions of the elements from element-to-element towards the radiating end of the structure. Second, by cutting the structure such that the cut lines follow two curves, especially straight lines, as indicated by the to dashed lines h—h in FIG. 15. Third, by decreasing (in different steps) the length of those parts of the element which extend in the direction of the axis as shown in FIG. 12. Fourth, by changing the number and length of the slots from element to element.

Figure 16:
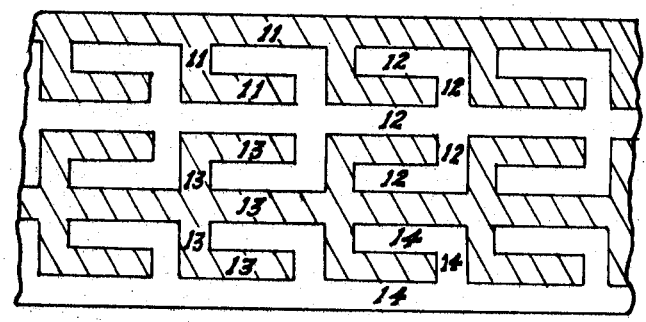
Figure 17:
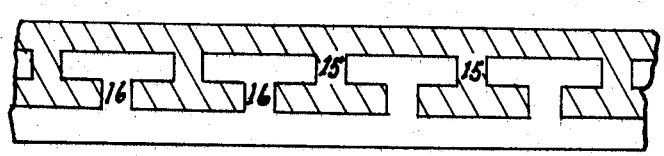

It is a special advantage of the structure according to the invention that it can be stamped from metal sheets or bands with nearly no material loss. Especially the structures according to FIGS. 2 to 6 are suitable for this procedure, if height and width of the elements and their spacing is chosen such as shown in FIG. 16. If it is assumed that the boom and the elements have the same width, then from a sheet of 10 times the width of the boom three complete slow wave structures can be fabricated. While the structures 12 and 13 in FIG. 16 come directly out from the stamping press, the third is obtained by combining the two half structures 11 and 14 to one unit. In a similar way from metal band of a width of 4 times the width of the boom two profiles 15 and 16, as shown in FIG. 17, can be stamped out in a continuous process, then cut to length and combined to a slow wave structure unit. Boom and element may also have different width. The boom, for example, could be made wider for mechanical reasons or both parts of the elements could have different widths so that slow wave structures for different frequency ranges would already come out from the stamping press.

The fabrication methods described in this invention are well suited for the production of UHF antennas. The structures can be first stamped in the whole length from metal sheets, then cut to the desired length and adjusted for the prescribed frequency range applying one of the described tuning methods. Finally, the structures have to be arranged in front of one of the usual feed systems such as a horn or one of the usual feed-reflector combinations consisting of a straight or folded dipole in front of one or more reflector rods or a reflector wall. If a broad band feed is used, the frequency range of the antenna can simply be changed by exchanging the slow wave structure.

Figure 18:
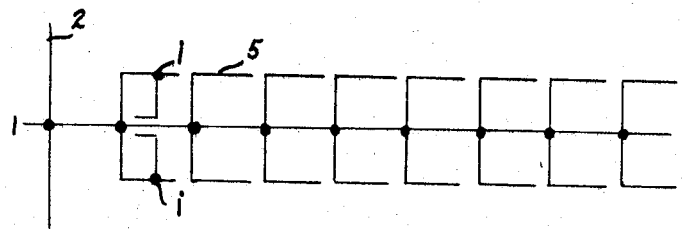
FIGS. 18 to 20 show three methods of combining the invention structure with complementary energy feeding means.

Most of the slow wave structures can also be directly fed, so that a separate feed dipole is not needed. FIG. 18 shows an endfire antenna using elements 5 as shown in FIG. 2. The energizing cable is directly connected with the first element of the structure. Letter i indicates the connection points for the feed cable, which for best matching can be moved along the horizontal parts of the first elements. Numeral 2 marks the usual rod reflector arranged in about one-quarter wave length behind the first element of the structure.

Figure 19:
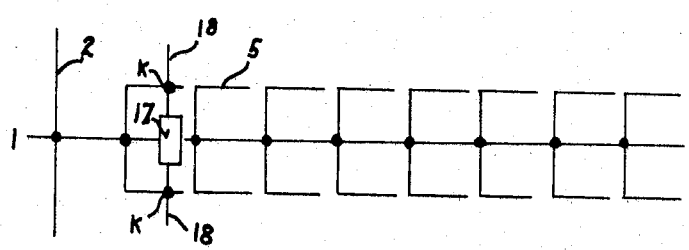
Figure 20:
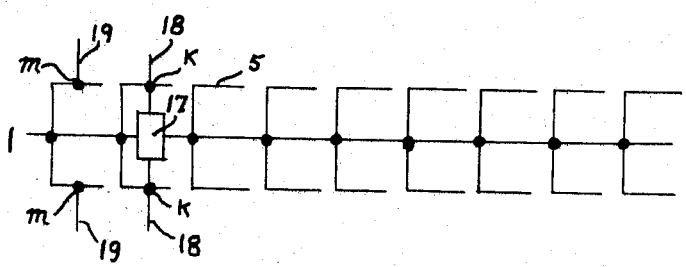

It has been found that best results are obtained if the structure is fed according to the method shown in FIG. 19. The energized element represents a combination of a straight dipole 18 and a folded dipole. Numeral 1 is again the boom, 2 marks a rod reflector, and 5 are elements according to FIG. 2. Still referring to FIG. 19, the numeral 17 therein indicates a symmetry transformer for connection of a two-wire transmission line or a concentric cable. Letter k marks the points at which the two halves of the dipole 18 are connected with the first element of the structure and transformer 17. Moving points k results in a change of matching between dipole and slow wave structure. Furthermore, the second element of the structure can be converted into a feed as described before, while the first element is converted into a reflector by adding metal part 19 at the point m, as shown in FIG. 20.

The main field of application for endfire antennas with slow wave structures according to the invention will be the VHF and UHF frequency range. However, such structures may also be advantageous for antennas for much lower frequencies, especially for ground antennas, when only half of the structure is used on a conducting ground. For this application, those parts of the elements which are parallel to the ground and are mostly made from wire, can be supported by masts. The height of such antennas over ground can be the smaller the narrower the desired bandwidth is. By applying the concept of the invention to endfire antennas which are already in existence, for example, to those for short wave communication, their height above ground could be essentially decreased.

What is claimed is:

1. In an endfire antenna array, the combination of a centrally disposed supporting boom and a series of transversely disposed wave directing elements of equal length and spacing along said boom, each element having portions spanning the boom in a manner to establish acute angular relationship to the longitudinal axis of the boom, and also having end portions disposed in parallelism with said longitudinal axis.

2. An antenna array as defined in claim 1, wherein each of said elements has a shape analogous to that of the character "sigma" of the Greek alphabet.

3. An antenna array as defined in claim 1, wherein each of said elements has a shape analogous to that of the character Z of the Roman alphabet.

References Cited

UNITED STATES PATENTS

| | | | |
|---|---|---|---|
| 2,401,472 | 6/1946 | Franklin. | |
| 2,417,808 | 3/1947 | Carter | 343—819 X |
| 2,647,211 | 7/1953 | Smeby | 343—802 X |
| 3,011,168 | 11/1961 | Isbell | 343—792.5 |
| 3,089,141 | 5/1963 | Odenwald | 343—802 |
| 3,106,714 | 10/1963 | Minerva | 343—899 X |
| 3,110,030 | 11/1963 | Cole | 343—792.5 |
| 3,148,370 | 9/1964 | Bowman | 343— 909 X |
| 3,389,396 | 6/1968 | Minerva et al. | 343—792.5 |

OTHER REFERENCES

DiFonzo, Daniel F.: "Reduced Size Log Periodic Antennas," In Proceedings National Communications Symposium, 9th Utica, N.Y. Oct. 7–9, 1963, pp. 121–132, article can also be found in "Microwave Journal" December 1964, pp. 37–42.

Jasik, Henry: Editor, "Antenna Eng. Handbook," Chapt. 5, by Southworth, George C., pp. 5–24–27, "End-Fire Parasitic Arrays (Yagi-Uda- Arrays)," McGraw-Hill, 1961.

Ehrenspeck, H. W., and Poehler H.: "A New Method for Obtaining Maximum Gain from Yagi Antennas," IRE Transactions on Antennas and Propagation, AP-7, 1959, pp. 379–386.

Blake, L. V.: "Antennas," J. Wiley & Sons, 1966, Sec. 5–3, "Parasitically Excited Endfire Arrays," pp. 231–233.

HERMAN KARL SAALBACH, Primary Examiner

W. N. PUNTER, Assistant Examiner

U.S. Cl. X.R.

343—833, 914